350-96.27 SR
10/29/85 OR 4,549,784

United States Patent [19]
Inokuchi

[11] Patent Number: 4,549,784
[45] Date of Patent: Oct. 29, 1985

[54] OPTICAL FIBER-GUIDED SCANNING DEVICE

[75] Inventor: Toshiyuki Inokuchi, Yokohama, Japan

[73] Assignee: Ricoh Company, Ltd., Japan

[21] Appl. No.: 531,764

[22] Filed: Sep. 13, 1983

[30] Foreign Application Priority Data

Sep. 14, 1982 [JP] Japan ............................ 57-160605

[51] Int. Cl.[4] ............................................ G01J 17/00

[52] U.S. Cl. ............................ 350/96.27; 350/96.10; 355/1

[58] Field of Search ............... 350/96.10, 96.12, 96.25; 355/1

[56] References Cited

U.S. PATENT DOCUMENTS

| | | | |
|---|---|---|---|
| 3,868,589 | 2/1975 | Wang | 350/96.12 X |
| 3,902,133 | 8/1975 | Watts | 350/96.12 X |
| 4,017,962 | 4/1977 | Palmer | 350/96.10 X |
| 4,087,315 | 5/1978 | Auracher et al. | 350/96.12 X |
| 4,376,576 | 3/1983 | Snelling | 355/1 X |
| 4,420,245 | 12/1983 | Katao | 355/1 X |
| 4,435,064 | 3/1984 | Tsukada et al. | 355/1 |

FOREIGN PATENT DOCUMENTS

| | | | |
|---|---|---|---|
| 0047734 | 4/1977 | Japan | 355/1 |
| 0070568 | 6/1981 | Japan | 355/1 |

*Primary Examiner*—William L. Sikes
*Assistant Examiner*—Akm E. Ullah
*Attorney, Agent, or Firm*—Guy W. Shoup

[57] ABSTRACT

An optical writing or scanning device includes an array of fluorescent light emitting elements provided on a substrate which is embedded with optical fibers for guiding the light emitted to an imaging surface such as a photoreceptor for forming an electrostatic latent image thereon. Such a structure of embedded optical fibers allows to make the device sturdy in structure, compact in size and reliable in operation. Besides, the use of fluorescent light emitting elements allows to fabricate the device with ease and at low cost.

16 Claims, 15 Drawing Figures

OPTICAL FIBER-GUIDED SCANNING DEVICE

BACKGROUND OF THE INVENTION

1. Field of the Invention

This invention relates to an optical scanning device using an array of light emitting elements for converting an electrical image signal into a light image signal to be applied to a light-sensitive recording medium, and, in particular, to an optical writing device for optically writing an image on a recording medium in accordance with electrical image information supplied thereto. More specifically, the present invention relates to a scanning device including an array of fluorescent light emitting elements, which are activated selectively to emit fluorescent light in the form of a desired pattern, and fiber optics for guiding the thus emitted fluorescent light to an imaging surface.

2. Description of the Prior Art

Various types of optical writing devices are used in numerous recording machines such as printers. These optical writing devices used in printers are often times constructed with a laser, optical fiber tubes ( OFT ) and light emitting diodes ( LED ). An optical writing device using a laser beam as employed in laser printers requires the provision of high-speed moving parts such as a polygonal mirror, which necessarily makes the scanning optical system complicated in structure. OFT printers tend to be bulky due to the size of their scanning optical system, and, moreover, a fine gap between the end surface of each OFT and the imaging surface must be maintained accurately. Some printers use LED arrays or PLZT crystal optical shutter arrays as optical writing elements, but these semiconductor writing elements are rather expensive and limited in size and thus two or more of them must be electrically connected if the scanning line sector is relatively large.

SUMMARY OF THE INVENTION

The disadvantages of the prior art are obviated and an improved optical scanning device is provided. In accordance with the present invention, use is made of an array of luminescent, preferably fluorescent, light emitting elements which is contained in a vacuum container together with a cathode filament and an electrode array. Preferably, the container comprises a substrate on which the fluorescent light emitting array is provided and a trough-shaped cover whose mouth may be sealingly attached to the substrate. Preferably, the substrate includes an array of light transmitting elements embedded therein thereby allowing to lead the fluorescent light emitted to an imaging surface as guided through the array of light transmitting elements.

Therefore, it is a primary object of the present invention to provide an improved optical writing device.

Another object of the present invention is to provide an optical writing device compact in size, simple in structure and inexpensive to fabricate.

A further object of the present invention is to provide an optical writing device reliable in operation and high in efficiency of light usage.

Other objects, advantages and novel features of the present invention will become apparent from the following detailed description of the invention when considered in conjunction with the accompanying drawings.

DESCRIPTION OF THE PREFERRED EMBODIMENTS

Figure 1:
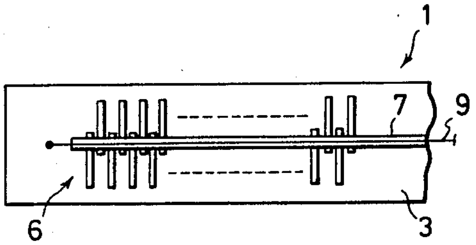
FIG. 1 is a fragmentary plan view showing the optical writing device constructed in accordance with one embodiment of the present invention.

Referring now to FIGS. 1–4, which illustrate an optical scanning or writing device 1 constructed in accordance with one embodiment of the present invention, the optical writing device 1 includes a glass substrate 3 of generally rectangular in shape, on which is provided a plurality of electrodes equally spaced apart from each other and arranged in the form of an array 7 and a light emitting film 7 of luminescent, preferably fluorescent, material which extends in the longitudinal direction of the substrate as overlying each of the electrodes. A trough-shaped glass cover 4 is provided with its mouth sealingly and fixedly attached to the top surface of the substrate 3 thereby forming an air-tight chamber between the substrate 3 and the cover 4. Thus, the substrate 3 and the cover 4 together define an enclosure member, and the air-tight chamber is preferably evacuated to become a vacuum chamber. A cathode filament 9 is provided as extending generally in parallel with and above the light emitting film 7 in the vacuum chamber. The filament 9 constitutes a counter electrode opposite to the electrode array 6 on the substrate 3. Although one end surface of the optical writing device is shown to be open in FIG. 4, it should be understood that an end plate is fixedly affixed to form a vacuum chamber.

Figure 2:
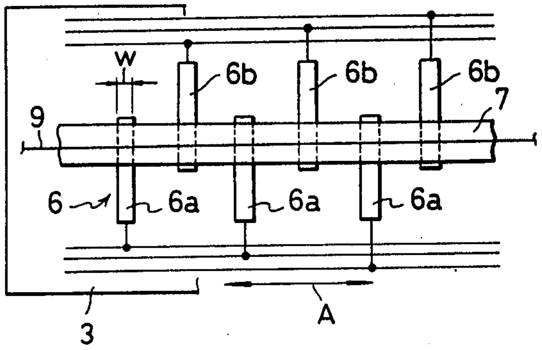
FIG. 2 is an enlarged plan view showing in detail a part of the structure shown in FIG. 1.
Figure 4:
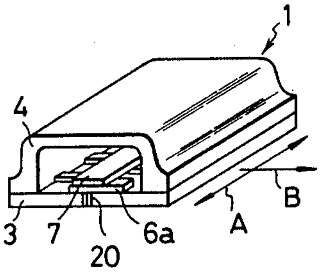
FIG. 4 is an isometric view showing the overall structure of the device shown in FIGS. 1–3.

In the illustrated embodiment, the electrodes forming the electrode array 6 are constructed to be transparent at least partly so that fluorescent light emitted from the light emitting film 7 may be passed through the electrodes at least partly. As shown in FIG. 2, the electrode array 6 includes lower electrodes 6*a* and upper electrodes 6*b* which are alternately arranged as extending in opposite directions perpendicular to the longitudinal direction of the light emitting film 7 which extends in the main scanning direction indicated by the arrow A. As well known in the art, the main scanning direction refers to a direction along which optical scanning is carried out. The light emitting film 7 is comprised of a material having the capability of emitting electromagnetic radiation, especially visible light, as a result of absorption of incident radiation such as hot electrons. Such a material includes a luminescent material having the property of phosphorescence and fluorescence, but a fluorescent material is generally preferred for the purpose of the present invention. The light emitting film 7 in the illustrated example is elongated in shape and provided as overlying partly each of the individual electrodes 6*a* and 6*b*. It is to be noted that the film 7 may be provided to be in direct contact with each of the electrodes or spaced apart therefrom. That portion of the film 7 which faces opposite to each of the electrodes 6*a* and 6*b* defines a picture element or dot, so that, effectively, there is formed an array of individual light emitting elements, each of which is largely defined by the width W of each electrode, so that the film 7 may emit light locally when activated.

Figure 6:
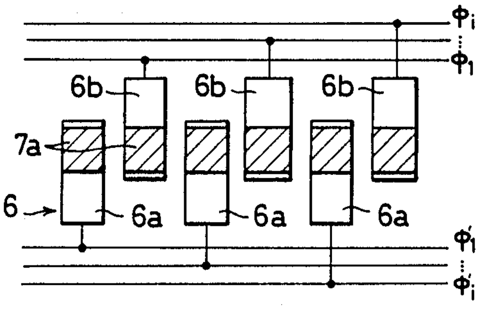
FIG. 6 is a schematic illustration showing the arrangement of fluorescent light emitting elements constructed in accordance with another embodiment of the present invention.

FIG. 6 illustrates another embodiment in which a light emitting array is formed by a plurality of light emitting elements 7*a* physically separate from each other, one for each electrode, instead of a continuously long film as in the previous embodiment. Although each of the light emitting elements 7*a* is defined in the shape of a square in this embodiment, they may take any other shape as desired. These separate light emitting elements 7*a* may also be provided either directly on the corresponding electrodes or spaced therefrom. The electrode array pattern and the light emitting array pattern may be fabricated by any well known film forming technology commonly used in the semiconductor technology. For example, photolithography and etching commonly used in I.C. patterning may be advantageously used.

With the substrate 3 formed of a transparent material such as glass, light emitted either from the film 7 or dots 7*a* may be obtained on that side of the substrate 3 which is opposite to the side on which the light emitting film 7 or dots 7*a* is provided. Thus, when the light emitting array is optically scanned along the main scanning direction A, a light pattern forming a line image may be obtained at the opposite side of the substrate 3. Accordingly, when the thus obtained light pattern is lead onto an imaging surface such as a light sensitive recording medium, an image may be recorded on the imaging surface. As will be described more fully later, optical scanning along the main scanning direction A is repeated at a predetermined frequency, and, at the same time, the imaging surface located opposite to the present optical writing device, or the outside surface of its substrate 3 to be more exact, is moved relative to the device in the so-called auxiliary scanning direction indicated by the arrow B in FIG. 4. As is well known in the art, the auxiliary scanning direction is normal to the main scanning direction and it indicates the direction of advancement of the imaging surface relative to the optical writing device.

Figure 7:
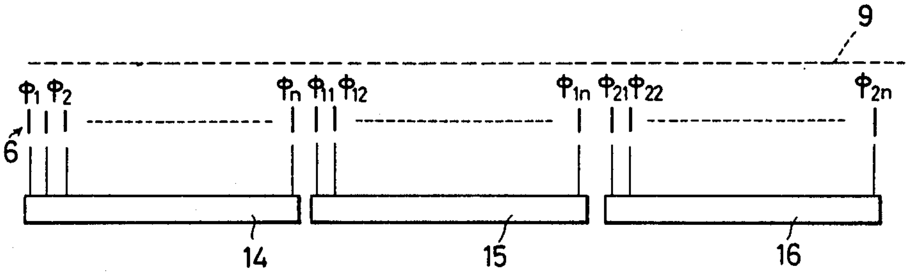
FIG. 7 is a schematic illustration showing one example of driving the light emitting array.

FIG. 7 illustrates one example of driving control to carry out selective activation of the light emitting array. In the present example, a predetermined voltage is selectively applied between the filament 9 acting as a cathode and a selected one of the electrodes 6 acting as an anode in accordance with an electrical image signal supplied from an external device. In the example illustrated in FIG. 7, the array of electrodes 6 is divided into three blocks and n-bit driver circuits 14, 15 and 16 are provided one for each block. These driver circuits 14, 15 and 16 are sequentially operated to supply activation signals to the corresponding electrodes 6 sequentially or at the same time. Thus, the individual electrodes 6 may be rendered operative in sequence one after another from one end to the other, or, alternatively, they may be rendered operative block by block with all of the electrodes in one block being rendered operative at the same time.

Selective activation of the light emitting elements 7 will now be described. Under normal conditions in which none of the electrodes 6 is selected for operation, electrons liberated into the vacuum chamber from the cathode 9 generally travel toward the electrodes 6 but they do not bombard any particular light emitting element. If $\phi i$ is a selected electrode, it receives an activation signal when rendered operative so that a predetermined voltage is applied between the cathode 7 and the selected electrode $\phi i$. As a result, the electrons emitting from the cathode 9 are directed preferentially toward this particular electrode $\phi i$ and thus the light emitting element 7 provided on this electrode becomes excited by receiving a significant amount of bombarding electrons. Thus, this particular light emitting element 7 corresponding to $\phi i$ electrode starts to emit light, or fluorescent light in the case where it is comprised of a fluorescent material. It will be easily appreciated that the fluorescent film 7 in FIG. 2 is locally excited depending upon the position of a selected electrode and thus that portion of the film overlapping the selected electrode will emit fluorescent light locally, though the film 7 itself is continuous. It is true that such a continuous film 7 is preferred from a manufacturing viewpoint for its easiness; however, the structure of fluorescent islands 7*a* shown in FIG. 6 is preferred from an operational viewpoint because there is less crosstalk between adjacent light emitting elements thereby allowing to obtain high resolution and contrast. In the case of the continuous film structure shown in FIG. 2, in order to prevent the blooming of emitted light in the longitudinal direction of the film from occurring as much as possible, it is preferable to set the width W of each electrode 6 reasonably small in relation to any characteristic size such as the dot pitch or interspace distance between two adjacent electrodes. For example, if a light emitting dot of 100 microns is desired, the electrode width W may be set approximately at 40 microns. With such considerations, a reasonably high resolution may be obtained even if use is made of a continuously long fluorescent film.

Figure 3:
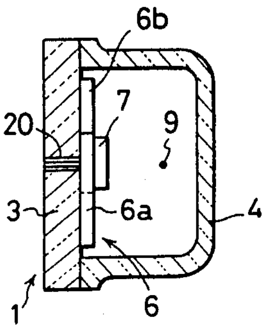
FIG. 3 is a transverse cross-sectional view of the device shown in FIG. 2.
Figure 5:
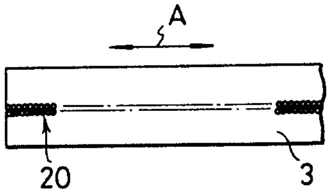
FIG. 5 is a schematic illustration showing the structure of the optical fiber-embedded substrate forming a part of the device shown in FIGS. 1–5.

As best shown in FIG. 3, the substrate 3 of the present optical writing device 1 includes an array of light transmitting elements 20, such as optical fibers, as embedded therein. As also shown in FIG. 5, the optical fibers 20 are arranged in the form of an array extending in the main scanning direction A as packed closely from one another. The optical fibers 20 embedded in the substrate 3 have their one ends located close to the corresponding light emitting elements so as to receive the light emitted therefrom and their opposite ends exposed and directed to the imaging surface on which an image is to be recorded. Such a structure is quite advantageous because the emitted light may be positively guided to an intended location, and, thus, the light intensity may be maintained at high level with a reduction in light scattering.

Figure 8:
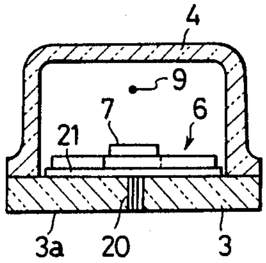
FIGS. 8 and 9 are transverse cross-sectional views showing two alternative embodiments of the present optical writing device.
Figure 9:
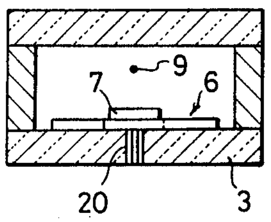

FIG. 8 illustrates an alternative structure in which a spacer 21, preferably of glass plate, is provided as sandwiched between the substrate 3 and the electrodes 6. Several advantages stem from such a structure. For example, this is particularly useful when non-contact type scanning is desired. That is, in the structure of FIG. 8, since the light incident end surfaces of the optical fibers 20 are spaced apart by the spacer 21, an optimum image forming surface may be defined at a position spaced apart by a small gap from the bottom surface *3a* of the substrate 3. Accordingly, there is no need to bring an imaging surface such as a photoreceptor in contact with the bottom surface *3a* of the optical writing device 1. In this instance, the gap between the optimum image forming surface and the bottom surface *3a* is generally determined by the thickness of spacer 21 and they are normally equal in magnitude.

Figure 11:
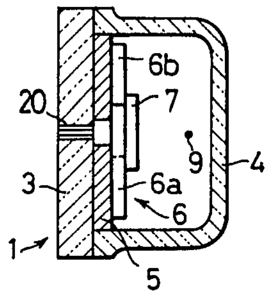
FIG. 11 is a transverse cross-sectional view of the device shown in FIG. 10.
Figure 10:
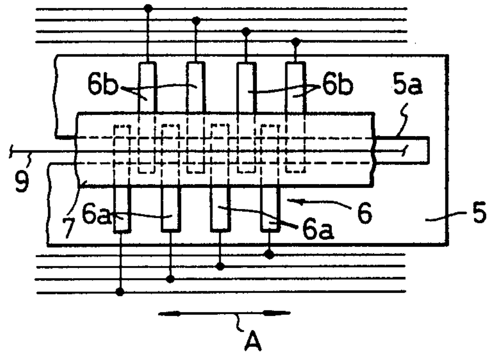
FIG. 10 is a schematic illustration showing the optical writing device constructed in accordance with a still further embodiment of the present invention.
Figure 12:
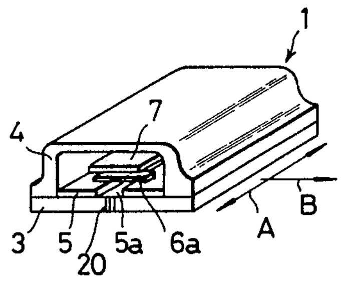
FIG. 12 is an isometric view showing the overall structure of the device shown in FIGS. 10 and 11.

FIGS. 10–12 illustrate a further embodiment of the present invention, and the optical writing device 1 of this embodiment is structurally similar to those described above excepting that the present optical writing device 1 is provided with a light shielding member 5 as sandwiched between the substrate 3 and the electrode array 6. The light shielding member 5, in effect, functions as a spacer as described above. The light shielding member 5 may be of any desired shape as long as it defines a positive light path between the light emitting elements 7 and the light transmitting elements 20 embedded in the substrate 3. It should be noted that since light transmitting elements 20 are provided as embedded in the substrate thereby allowing the emitted light to pass through the substrate in a well-guided manner, the substrate 3 itself may be made of a non-transparent material, if desired. Be that as it may, it does not exclude the provision of the light shielding member 5 since it can possess the role as a spacer.

In this particular embodiment shown in FIGS. 10–12, the light shielding member 5 is formed on the substrate 3 in the form of a film, and a slit *5a* having the width in the order of 100 microns is formed in the light shielding film 5 thereby defining the expanse in cross section of a light path between the fluorescent film 7 and the optical fibers 20 embedded in the substrate 3. As shown, the slit *5a* extends in the main scanning direction A and it is in parallel with the cathode filament 9, as best shown in FIG. 10. The individual electrodes *6a* and *6b* are alternately arranged and each of them extends long enough in the direction perpendicular to the slit *5a* to bridge thereacross. Similarly with the previous embodiments, alternate electrodes *6a* or *6b* extend far in opposite directions, either upward or downward in FIG. 10, thereby easing lead connection to respective electrodes. The fluorescent film 7 is provided in contact with each of the electrodes *6a* and *6b* covering the slit *5a*. The film 7 may, for example, be fabricated by screen printing as deposited on the electrodes *6a* and *6b*. In this embodiment, an overlapping cross section between each of the electrodes *6a* and *6b* and the slit *5a* determines the shape of a light emitting dot.

Figure 13:
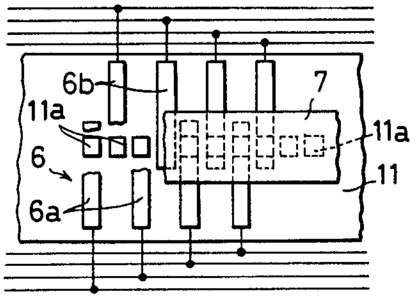
FIG. 13 is a schematic illustration showing the optical writing device constructed in accordance with a still further embodiment of the present invention.

FIG. 13 illustrates a modification of the above embodiment shown in FIGS. 10–12, and, as shown, this embodiment includes a light shielding member 11 provided with an array of squarely-shaped windows 11a arranged in the main scanning direction A and spaced apart from one another at a predetermined pitch instead of the slit *5a* in the embodiment of FIGS. 10–12. This embodiment also includes the substrate 3 including the optical fibers 20 as embedded therein.

Figure 14:
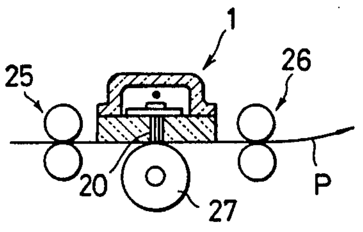
FIGS. 14 and 15 are schematic illustrations showing two examples of recording machines to which the present optical writing device is applied.
Figure 15:
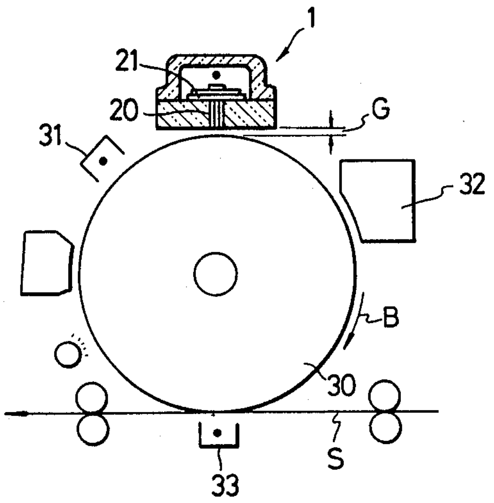

FIGS. 14 and 15 illustrate two examples of application of the present optical writing device to recording machines. In the recording machine of FIG. 14, photosensitive paper P is transported as guided by two pairs 25 and 26 of transport rollers and pressed against the bottom surface, where light emitting ends of the optical fibers 20 are located, of the optical writing device 1 by means of a pressure roller 27. A line image is consecutively recorded on the photosensitive paper P as it is transported in the direction indicated by the arrow, so that a two-dimensional image may be obtained as recorded on the paper P.

FIG. 15 shows a non-contact type recording machine in which the optical writing device 1 is not in contact with an imaging surface. In FIG. 15, there is provided a photosensitive drum 30 having a photosensitive layer around the peripheral surface of the drum. The drum 30 is rotatably supported and various image forming components are disposed around the periphery of the drum 30 as shown. Thus, when the drum 30 is driven to rotate in the direction indicated by the arrow B, the peripheral surface of the drum 30 is uniformly charged to a predetermined polarity by means of a corona charger 31, and, then, the charge is selectively dissipated by receiving a light pattern applied from the present scanning device 1 so that an electrostatic latent image is formed on the peripheral surface of the drum 30. Then, the thus formed latent image is developed by a developing device 32 to be converted into a visible image, typically a toner image, which is then transferred to transfer paper S by means of an image transfer device 33. In this case, the optical scanning or writing device 1 is disposed at a location spaced apart from the peripheral ( imaging ) surface of the drum 30 over a gap G so that the optical writing device 1 is not in contact with the imaging surface. As described previously, such a gap G may be easily determined by selecting the thickness of spacer 21 appropriately. With such a structure, an optimum image forming surface may be set at a distance separated away from the optical writing device 1, which, in turn, allows to prevent scars from being imparted to the imaging surface of the drum 30.

The embodiment shown in FIG. 3 may be advantageously applied to the recording machine of the type shown in FIG. 14; whereas, the embodiment shown in FIG. 8 may be advantageously applied to the recording machine of the type shown in FIG. 15, though these embodiments shown in FIGS. 3 and 8 are not solely limited to these applications. For example, the embodiment shown in FIG. 3 may be equally applied to the recording machine of FIG. 15 without problem. Furthermore, as briefly mentioned before, either one or both of the substrate 3 and cover 4, together forming a complete enclosure, may be made of a non-transparent material When recording machines are constructed incorporating the present optical writing device, various advantages may be obtained as follows. Since it is basically a solid-state scanning system, it does not require the provision of any moving parts, such as a polygonal mirror, as different from a scanning system in a laser printer. Since the present optical scanning device is relatively simple in structure as compared with the counterpart in a laser printer, the overall structure may be made compact in size and thus light in weight. As compared with crystal based solid-state scanning systems such as a LED scanning system, no limitation in size is present so that a light emitting array of desired length may be easily fabricated as a unit without requiring interconnection between different chips as in the case of a lengthy LED array. When the driving circuit is structured in a partial simultaneous driving mode in which a plurality of light emitting elements are divided into a predetermined number of blocks thereby operating those elements in the same block at the same time, the light emitting period of each element may be set longer, or use may be made of an activation pulse having a larger pulse width as compared with a common CRT recording system using the raster scanning. This allows to reduce the intensity of emitted light and to carry out a high speed operation. As compared with an LED array, the light emitting efficiency is higher so that power consumption is lower and heat dissipation is smaller. The PLZT light shutter array requires the provision of a separate light source such as a fluorescent lamp; however, this is not the case in the present invention which basically provides a maintenance-free optical writing device.

Furthermore, use of an optical fiber-embedded substrate allows a wider selection of material for the substrate and miniaturization of the entire device since no external image forming elements such as mirrors and lenses are required to be provided. The provision of optical fibers embedded in the substrate also presents sturdiness in structure and reliability in operation. Using optical fibers having a large NA, high light intensity may be obtained at the imaging surface, and, in this instance, since it becomes highly stable against chromatic aberration, the scope of selection for the spectrum of emitted light is broadened.

While the above provides a full and complete disclosure of the preferred embodiments of the present invention, various modifications, alternate constructions and equivalents may be employed without departing from the true spirit and scope of the invention. For example, the present invention may be applied to various recording machines such as printers, line displaying devices, scanners and digital copiers. Therefore, the above description and illustration should not be construed as limiting the scope of the invention, which is defined by the appended claims.

What is claimed is:

1. An optical writing device for optically writing an image on an imaging surface, comprising:

a substrate;

a plurality of first electrodes provided on said substrate as spaced apart from one another and arranged in the form of an array, each of said first electrodes being transparent at least partly;

means for driving said plurality of first electrodes selectively in accordance with an image signal supplied thereto from an external source;

at least one second electrode disposed generally opposite to said plurality of first electrodes, said second electrode being maintained at a predetermined potential and capable of emitting electrons;

light emitting means provided in contact with or above said plurality of first electrodes, said light emitting means being capable of emitting light when said first electrodes are selectively driven to cause the electrons emitted from said at least one second electrode to impinge thereon; and light transmitting means provided as embedded in said substrate, said light transmitting means having one end so located to receive light emitted from said light emitting means and another end so located to direct the light thus received to said imaging surface.

2. A device of claim 1, further comprising a cover whose mouth is sealingly and fixedly attached to said substrate to define a completely enclosed chamber in which at least said light transmitting means and at least one second electrode are disposed.

3. A device of claim 2 wherein said chamber is evacuated to a vacuum state.

4. A device of claim 3 wherein said at least one second electrode includes a filament acting as a cathode.

5. A device of claim 3 wherein said light emitting means includes an elongated film of a light emitting material extending in the logitudinal direction of said array of first electrodes.

6. A device of claim 5 wherein said light emitting material includes a luminescent material.

7. A device of claim 6 wherein said luminescent material is a fluorescent material.

8. A device of claim 3 wherein said light emitting means includes a like plurality of light emitting islands provided one for each of said plurality of first electrodes.

9. A device of claim 8 wherein each of said light emitting islands is comprised of a luminescent material.

10. A device of claim 9 wherein said luminescent material is a fluorescent material.

11. A device of claim 1 wherein said light transmitting means includes a plurality of optical fibers.

12. A device of claim 11 wherein said optical fibers have a high value of NA.

13. A device of claim 1 further comprising a spacer as sandwiched between said substrate and said plurality of first electrodes.

14. A device of claim 1 further comprising a light shielding member as sandwiched between said substrate and said plurality of first electrodes, said light shielding member being provided with a profiled light passage for limiting the expanse of light emitted from said light emitting means toward said light transmitting means.

15. A device of claim 14 wherein said profiled light passage is an elongated slit extending along said array of first electrodes.

16. A device of claim 14 wherein said profiled light passage is defined by a like plurality of individual windows located on one-to-one correspondence to said plurality of first electrodes.

* * * * *